(12) United States Patent
Kemkemian et al.

(10) Patent No.: US 8,786,487 B2
(45) Date of Patent: Jul. 22, 2014

(54) RADAR WITH WIDE ANGULAR COVERAGE, NOTABLY FOR THE OBSTACLE AVOIDANCE FUNCTION ON BOARD AUTO-PILOTED AIRCRAFT

(75) Inventors: Stephane Kemkemian, Paris (FR); Pascal Cornic, Guilers (FR); Patrick Garrec, Merignac (FR); Patrick Le Bihan, Lannilis (FR); Myriam Nouvel-Fiani, Elancourt (FR)

(73) Assignee: Thales, Neuilly sur Seine (FR)

( * ) Notice: Subject to any disclaimer, the term of this patent is extended or adjusted under 35 U.S.C. 154(b) by 386 days.

(21) Appl. No.: 13/247,118

(22) Filed: Sep. 28, 2011

(65) Prior Publication Data

US 2012/0081247 A1    Apr. 5, 2012

(30) Foreign Application Priority Data

Sep. 28, 2010  (FR) ...................... 10 03834

(51) Int. Cl.
*G01S 13/00* (2006.01)
*G01S 13/93* (2006.01)
*H01Q 3/26* (2006.01)

(52) U.S. Cl.
CPC ................ *G01S 13/9303* (2013.01); *H01Q 3/267* (2013.01)
USPC .............. 342/29; 342/165; 342/174

(58) Field of Classification Search
CPC .............. G01S 13/4463; G01S 13/953; G01S 2013/0254; G01S 13/04; G01S 13/9303; G01S 13/106
USPC .................... 342/29, 107, 109, 112, 173, 174
See application file for complete search history.

(56) References Cited

U.S. PATENT DOCUMENTS 5,481,270 A * 1/1996 Urkowitz et al. ............. 342/101
8,299,958 B2 * 10/2012 Kemkemian et al. ......... 342/107

(Continued)

FOREIGN PATENT DOCUMENTS

EP    2192418 A1    6/2010
FR    2949867 A1    3/2011

(Continued)

OTHER PUBLICATIONS

Shannon D. Blunt, et al., "Adaptive Pulse Compression via MMSE Estimation", IEEE Transactions on Aerospace and Electronic Systems, Apr. 1, 2006, pp. 572-584, vol. 42, No. 2, XP55003560.

(Continued)

*Primary Examiner* — John B Sotomayor
*Assistant Examiner* — Marcus Windrich
(74) *Attorney, Agent, or Firm* — Baker & Hostetler LLP

(57) ABSTRACT

A radar includes a transmitting antenna and receiving antenna formed by an array of radiant elements. Antenna beams are calculated in P directions by a BFC function. Detections of a target by secondary lobes of the beams are processed by an algorithm comparing levels received in a distance-speed resolution cell, a single detection at most not being possible for each distance-speed resolution cell. Processing means use the assumption that there may probably be more than one echo with a signal-to-noise ratio that is sufficient to be detectable, for a given resolution cell of the radar, either in speed mode or in distance mode, or, alternatively, a distance-speed depending on the processing implemented; and, if there is more than one echo detectable for each resolution cell out of the plurality of beams formed by BFC, only the echo and BFC that obtain maximum power or maximum signal-to-noise ratio are/is considered valid.

11 Claims, 7 Drawing Sheets

(56) References Cited

U.S. PATENT DOCUMENTS

| | | | |
|---|---|---|---|
| 8,307,922 B2* | 11/2012 | Perlman et al. | 180/2.1 |
| 2008/0180323 A1* | 7/2008 | Kemkemian et al. | 342/372 |
| 2011/0140952 A1* | 6/2011 | Kemkemian et al. | 342/146 |
| 2011/0160941 A1* | 6/2011 | Garrec et al. | 701/17 |
| 2011/0221625 A1 | 9/2011 | Cornic et al. | |

FOREIGN PATENT DOCUMENTS

| | | | |
|---|---|---|---|
| FR | 2950147 A1 | 3/2011 | |
| FR | 2950148 A1 | 3/2011 | |
| FR | 2951278 A1 | 4/2011 | |

OTHER PUBLICATIONS

Marco Martorella, et. al., "On the Fractal Dimension of Sea Surface Backscattered Signal at Low Grazing Angle" IEEE Transactions on Antenna and Propagation, May 1, 2004, pp. 1193-1204, vol. 52, No. 5, IEEE Service Center, Piscataway, NJ, US, XP011112536.

Stephan E Kemkemian, et al., "A Mimo Radar for Sense and Avoid Function—A Fully Static Solution for UAV", IRS 2010, Jun. 16-18, 2010, pp. 1-20, Vilnius, Lithuania.

* cited by examiner

RADAR WITH WIDE ANGULAR COVERAGE, NOTABLY FOR THE OBSTACLE AVOIDANCE FUNCTION ON BOARD AUTO-PILOTED AIRCRAFT

CROSS-REFERENCE TO RELATED APPLICATION

This application claims priority to foreign French patent application No. FR 1003834, filed on Sep. 28, 2010, the disclosure of which is incorporated by reference in its entirety.

FIELD OF THE INVENTION

The present invention relates to a radar system with wide angular coverage, notably for the obstacle avoidance function on board auto-piloted aircraft.

BACKGROUND

It is known practice to use a radar function for detecting non-cooperative airborne objects for aircraft, in particular to equip drones. This function is essential to allow for the insertion of auto-piloted aircraft in the non-segregated air space. It participates in the obstacle avoidance function, known by the name "Sense and Avoid" (S&A).

Such a radar needs to have a very wide field of observation (typically ±110° in azimuth and ±15° in elevation) and must be capable of scanning the space in a very short time, of the order of a second, given the time it takes to undertake an avoidance manoeuvre in the presence of collision risks. These characteristics correspond approximately to the environment observation capability of a "human" pilot ("See and Avoid"). For such an application, it is advantageous to use one or more antennas with wide transmission field, a plurality of antennas with little directivity in reception mode and to form, in reception mode, multiple beams simultaneously in the illuminated space: this is the technique known to those skilled in the art by the name "Beam Formation by Calculation" or "BFC". This solution is conventionally implemented using planar arrays of antennas for which the patterns formed need to have a directivity that is sufficient to locate the targets with good accuracy.

Some of the above points can be resolved by the solutions described in the patent applications FR09 04395, FR09 04224, FR09 04394 and FR09 04880.

In the Patent Application FR09 04395, the general problem of the radar system is resolved by introducing, in its preferred solution, a double waveform managed adaptively:
- the fast targets are detected at a great distance by a waveform without Doppler ambiguity where these fast targets can be detected on thermal noise after Doppler filtering;
- the near or slow targets in clutter are detected by a waveform adapted to the visibility in ground clutter:
  - it is not ambiguous, either in distance or in speed (the targets concerned are near and slow).
  - It is preferably a waveform with "high" distance resolution (distance-separating power).

In the Patent Application FR09 04224, the problems linked to the antenna system are resolved by using, in its preferred solution, a "separate antennas in cross" configuration associated with a principle of "coloration" of the space in transmission and with the use of the Beam Formation by Calculation (BFC) in reception. The coloration of the space involves transmitting N orthogonal signals on N transmitting antennas. These signals are then separated by filtering on reception given their orthogonality properties. It is, for example, possible, with two contiguous antennas in transmission associated with two or more orthogonal codes to produce, in transmission, the functional equivalent of a "single-pulse" angular measurement system.

In the case of the preferred solution described in the Patent Application FR09 04224, the two waveform generators (WFG) are successively connected to three arrays, one array consists of a pair of antennas oriented towards three different bearings to cover the space in bearing mode. This patent application proposes an alternative to the use of three switched arrays by introducing, notably in the "transmission" part, a discrete electronic scanning in three directions by virtue of switches acting at low level (before the power stage). This switching may employ, for example, delay lines short-circuited by PIN diodes or MEMS devices.

The Patent Application FR09 04394 notably describes waveforms and the signal processing principles to best exploit the antenna configuration described in Patent Application FR09 04224 and by taking into account the adaptive nature of the choice of the waveforms described in the Patent Application FR09 04395.

The Patent Application FR09 04880 improves on the angular measurement accuracy of the system described in Patent Application FR09 04224. This solution notably consists in simultaneously associating:
- an interferometer that is accurate but ambiguous in reception;
- a space coloration principle in transmission.

It is the combination of the angular measurements obtained from the interferometer, accurate but ambiguous, and of the space coloration system which ultimately makes it possible to obtain accurate and unambiguous angular measurements by virtue of the so-called "single pulse in transmission" system, with the coloration in transmission, which is used to measure at least the ambiguity rank of the angular measurement supplied by the interferometer.

An exemplary embodiment according to the abovementioned patent applications was presented at the "IRS 2010" conference on 17 Jun. 2010 in "A MIMO Radar for Sense and Avoid Function—A fully static solution for UAV" by Stéphane KEMKEMIAN et al.

If the receiving antennas are linear arrays, their coverage in azimuth is generally limited to ±60° relative to the normal to the array, or even more, if a performance degradation is accepted. This coverage is insufficient in light of the need expressed previously (coverage of ±110° in azimuth). In these conditions, two preceding devices are needed, each covering at most only approximately ±60° and each being oriented towards a particular direction.

These two devices can work alternately or else simultaneously:
- In the first case, each system works only 50% of the time. All other things being equal, a loss of 3 dB ensues due to the reduction of the signal integration time;
- In the second case, assuming that the conditions necessary for the simultaneous operation are satisfied, there is no loss on each of the two devices, but the transmitted power is doubled. If a constant total transmitted power (therefore constant consumption on the onboard electrical network is assumed), there will also be a loss of 3 dB.

Furthermore, in both cases, the bulk on board of the drone is doubled.

One aim of the invention is to retain the same energy efficiency:
- by accepting a size increase only for the receiving antennas;
- by retaining a single transmitting antenna;

by increasing the angular coverage of a single system up to ±110° in azimuth.

The result is a single radar and not a doubled system as in the preceding case where the receiving antennas are perfectly linear.

The vertical locating principle described notably in the Patent Application FR09 04880 is retained. The same applies regarding the use of the Beam Formation by Calculation in the horizontal plane described notably in the Patent Applications FR09 04224, FR09 04394 and FR09 04880.

SUMMARY OF THE INVENTION

The subject of the invention is a radar system comprising at least one transmitting antenna and one receiving antenna formed by an array of radiant elements, the configuration of the array being characterized by a set of parameters determining its geometrical form, the number of radiant elements and the pitch between the radiant elements, the antenna beams being calculated in P directions by a BFC function, the radiation pattern of said antenna being determined to maximize the antenna gain, the configuration of the array is defined according to the following steps:

- in a preliminary step, a basic configuration of said array is chosen;
- in a first step, the signal expected from a target in said P directions is determined;
- in a second step, the summation, for each of said P directions, of the signals received by each radiant element is determined so as to maximize the signal-to-noise ratio at the output of said summation;
- in a third step, a figure of merit is calculated as a function of the signal-to-noise S/N ratios received on said P directions;
- in a fourth step, the parameters of the array are varied and then there is a loop back to the first or the second step depending on the parameters of the array that have been modified, the configuration being chosen from the configurations which maximizes the figure of merit.

The basic configuration of the array is, for example, a polyhedron, a dihedron or even a continuous curve in the azimuth plane relative to the radar.

The transmitting antenna covers, regularly for example, the region to be covered in azimuth.

The figure of merit is, for example, a function of an angular regularity criterion of the receiving antenna gain or signal-to-noise ratio received over a given angular range.

The figure of merit may also be a function of eliminatory conditions not ensuring a minimum coverage of certain directions in the radar detection space.

The possible detections of a target by the secondary lobes of one or more beams formed by BFC are, for example, processed using an algorithm based on the comparison of the levels received in a distance-speed resolution cell of the radar, a single detection at most not being possible for each distance-speed resolution cell.

It is, for example, assumed that there may probably be no more than one echo with a signal-to-noise S/N ratio that is sufficient for it to be detectable, for a given resolution cell of the radar, either in speed mode or in distance mode, or, alternatively a distance-speed depending on the processing implemented. In another possible implementation, if there is more than one echo detectable for each resolution cell out of the plurality of beams formed by BFC, only the echo and the BFC that obtain the maximum power or the maximum signal-to-noise S/N ratio are/is considered valid.

The angular direction of the target is, for example, obtained by a technique similar to the single-pulse technique, the precise direction being a function of the signal received in the BFC lobe where the signal maximum has been observed and on at least one of the adjacent lobes.

The precise angular direction of the target is, for example, obtained by a technique similar to the single-pulse technique by using two BFC lobes, the lobe where the received signal is at its maximum and the lobe in immediate proximity where the signal has a power just below the maximum.

Advantageously, the system according to the invention equips an aircraft to ensure an obstacle avoidance function, this aircraft being, for example, auto-piloted.

BRIEF DESCRIPTION OF THE DRAWINGS

Other features and advantages of the invention will become apparent from the following description, given in light of the appended drawings which represent.

DETAILED DESCRIPTION

Figure 1:
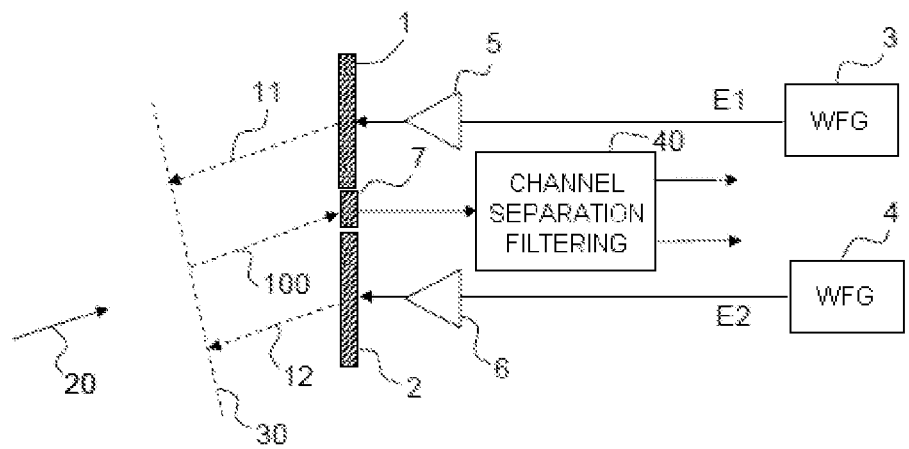
FIGS. 1 and 2, an exemplary radar system represented notably by its transmitting and receiving parts.
Figure 2:
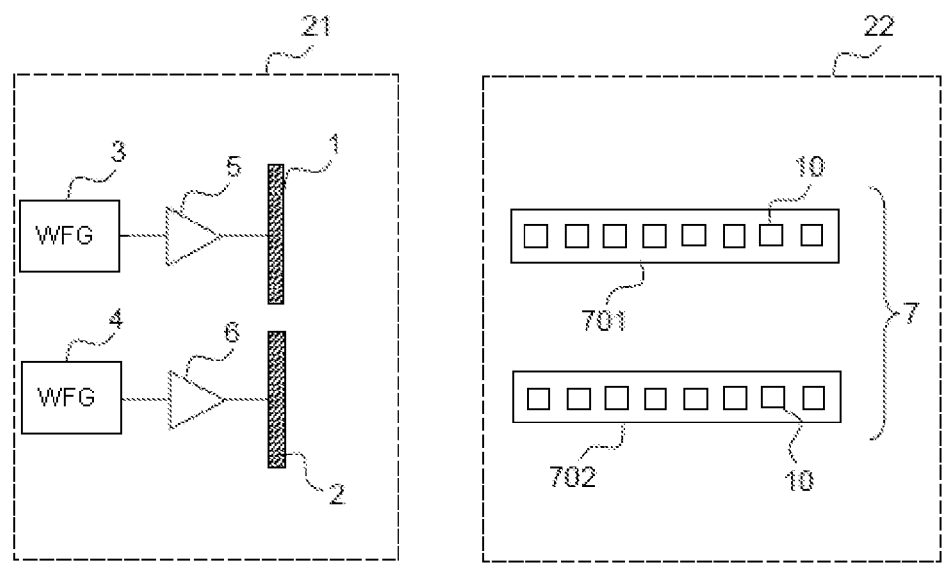

FIGS. 1 and 2 illustrate the transmission and reception system used in the Patent Application FR09 04880.

The system notably combines:

- an interferometer that is accurate but ambiguous in reception, the receiving antenna of this interferometer constituting the receiving antenna of the radar;
- a space coloration mode in transmission.

The coloration of the space involves transmitting N orthogonal signals on N transmitting antennas. These signals are then separated by filtering 40 on reception on the basis of their orthogonality properties.

FIG. 1 illustrates an exemplary embodiment in which N=2. The transmission system comprises two contiguous transmitting antennas 1, 2 each associated with a code, the set of these two antennas forming one transmitting antenna. The first antenna 1 is thus associated with a first code E1 and the second antenna is thus associated with a second code E2, the two codes being mutually orthogonal, and therefore separable by filtering. It is then possible to perform, with a single receiving antenna, a "single-pulse" angular measurement by creating, by processing, two receiving channels, one suitable for receiving the code E1, the other suitable for receiving the code E2. A "single pulse in transmission" system is thus constructed.

A first waveform generator 3 supplies a transmission signal transmitted according to the code E1, this signal is then amplified by a power amplifier 5 before being delivered to the first antenna 1. A second waveform generator 4 supplies a transmission signal transmitted according to the code E2, this signal is then amplified by a power amplifier 6 before being delivered to the second antenna 2. The coding functions are, for example, incorporated in the waveform generators 3, 4.

The transmission signals 11, 12 are transmitted by each half 1, 2 of the transmitting antenna. FIG. 1 illustrates the progression of a wave transmitted in a given direction 20 according to the progression of the phase plane 30.

A reception signal 100 is, for example, received in this direction 20. This signal is received by a receiving antenna 7.

FIG. 2 presents, by a block diagram, the transmission part 21 and the reception part 22 of the transmission and reception system of a radar according to the invention. The transmission part comprises the waveform generators 3, 4 and the amplifiers 5, 6 associated with each antenna 1, 2, as described in relation to FIG. 1. The reception part comprises two array antennas 701, 702 consisting of radiant elements 10, these two antennas forming the interferometry system. It is assumed that the two antennas each consist of M radiant elements 10. The identity of the two interferometry antennas is not necessary, but the use of different antennas may complicate the implementation of the system. It may be noted that the invention also applies by not using vertical interferometry in reception, that is to say, in the case where there is a single antenna in reception. Each antenna of the interferometry system is hereinafter designated by the term array.

The Patent Application FR09 04394 uses two waveforms of very distinct types:
- a first waveform without speed ambiguity, optimized for the fast targets situated outside the Doppler region of the ground clutter and for which a great detection range is required;
- a second waveform suited to the slow targets situated in the Doppler region of the ground clutter for which it is the ability to detect these targets potentially embedded in the ground clutter which is the dimensioning criterion, not a great range.

The invention uses, preferably in case of the first waveform for fast targets, all of the receiving elements 10 of the array to perform a Beam Formation by Calculation (BFC) in the circular plane of the array which maximizes the signal-to-noise ratio in P particular directions without being concerned with the quality of the pattern of secondary lobes of these duly formed beams. In other words, if the interest is in the azimuth direction $\psi_1$, the level of secondary lobes in a direction $\psi_2$ very different to $\psi_1$ is unimportant.

Moreover, still in the case of the first waveform for fast targets, the invention applies a particular processing which obviates the possible poor quality of the P patterns formed by BFC. In particular, the waveforms employed described notably in the Patent Application FR09 04394 have waveforms with high Doppler and/or distance resolution. Since the invention is applied in a Doppler region outside of ground clutter, only the fairly fast targets, useful or not, may be present in the distance-speed space processed.

Figure 3:
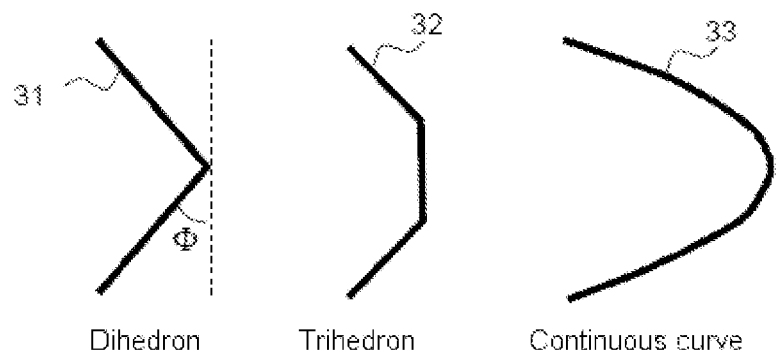
FIG. 3, exemplary antenna array configurations used in a radar according to the invention.

FIG. 3 illustrates possible exemplary embodiments of an array 10, represented by curves in the azimuth plane. In the general case, an array is neither planar nor linear and is not necessarily uniformly distributed since the aim is to cover the maximum of space in azimuth. In the case of the first waveform for fast targets, a switching of linear segments according to the direction observed is notably not used. In other words, it may be an array which is not of the "ULA" (Uniform Linear Array) type. FIG. 3 shows, by plan views, three exemplary arrays 10. The first two examples are in the form of a polyhedron, a dihedron for the first 31 and a trihedron for the second 32. The third example 33 shows a continuous curve.

The following notations will hereinafter be used:

The symbol ● designates the scalar product of two vectors.

$A^T$: matrix or transposed vector of A.

$\overline{A}$: complex conjugate of A.

$A^H$: matrix or transposed and conjugate vector of A.

$k \in [1,P]$, index of one of the P directions of beam formation by calculation. After the BFC process, a discrete "angular pattern" of the received signal is formed in P directions.

$i \in [1,M]$, index of an element of the array of M elements. If M<P, the BFC is oversampled. If M>P, the BFC is undersampled: all the signals will not be intercepted.

X=observation vector: signals received $x_i$ by the M elements: $X=[x_1 \ldots x_M]^T$.

S(k)=vector of the signals expected a priori for a signal originating from the $k^{th}$ direction of BFC: $S(k)=[s_1(k) \ldots s_M(k)]^T$.

W=vector of the gains $w_i$ used to weight the observations $x_i$ to form, by BFC, the beam in the $k^{th}$ direction of BFC: $W(k)=[w_1(k) \ldots w_M(k)]^T$.

Let n be the vector of the $n_i$ noise contributions by the i=1, . . . M elements of the array.

Let $R=E\{n.n^H\}$ be the covariance matrix (M×M) of the noises received by the M elements of the array.

In the case of the first waveform (target on thermal noise and not external interference), all the noises are assumed independent. In this case: $R=\sigma^2 I$, in which $\sigma^2$ is the power of the thermal noise on a reception channel (assumed identical for all the sources) and I is the identity matrix of dimension M. This is not the case with the 2nd waveform where there is clutter.

The aim of the choice of the configuration of the array, as illustrated by FIG. 3, is to obtain, for the first "fast targets" waveform and by BFC, the highest possible signal-to-noise ratio within a very extensive field of possible angular observations, with constant given incident power flux. For this, one of the objectives of the invention is to choose a form for this array and a distribution of the weights assigned to each element of the array in the BFC process in order to maximize a figure of merit which quantifies that which has just been mentioned previously.

In the general case, this figure of merit is a function of the S/N ratios received on the P scanned directions. In the case where the detection occurs on thermal noise, this amounts to calculating a function of the antenna gains after BFC in the P directions. It is assumed in this case that the thermal noises of the M sources of the array have the same power and are decorrelated.

For example, two types of figure of merits can be cited:

1. Factor type 1: Regularity of the S/N ratio in the scanning space:

$$Q = \frac{1}{P} \sum_{k=1}^{P} \beta_k \cdot SNR(\psi_k);$$

2. Factor type 2: Eliminatory criterion if certain directions are not covered and regularity criterion in the scanning space:

$$Q = \left(\prod_{k=1}^{P} \beta_k \cdot SNR(\psi_k)\right)^{\frac{1}{P}}.$$

$\beta_k$ is a weighting factor associated with the $k^{th}$ direction intended to prioritize or not prioritize certain directions. Many other criteria can be formed.

As indicated previously, this choice of optimization does not take into account the quality aspect of the antenna pattern formed. The exemplary embodiment which follows shows how this aspect is taken into account without the operational functionality of the radar being affected.

Figure 4:
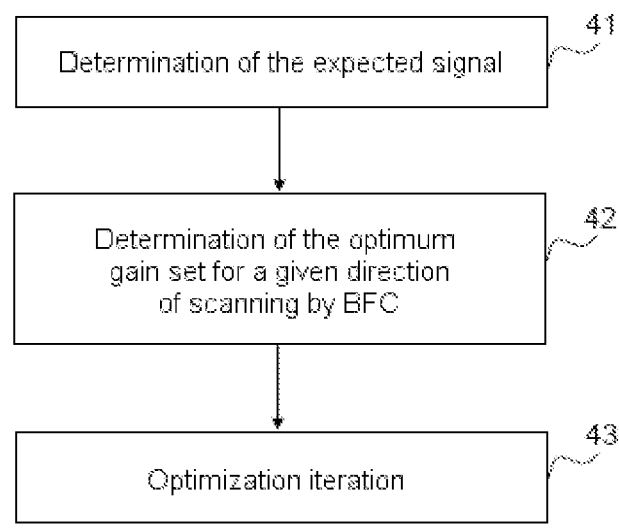
FIG. 4, the major steps in obtaining an antenna array used in a radar according to the invention.

FIG. 4 illustrates three possible steps for optimizing the first waveform, for fast targets. The form of the array (dihedron 31, trihedron 32, continuous curve 33, etc.) and the adjustment of the gain coefficients in the BFC are determined to maximize the figure of merit defined previously. The optimization process that notably makes it possible to define the form of the array and the weight of the elements, is iterative. Aspects relating to the mechanical feasibility of the antennas may also be taken into account.

The optimization process comprises, for example, the following steps:
  a first step 41 of determining the expected signal;
  a second step 42 of determining the optimum gain set for a given direction of scanning by BFC;
  a third step 43 of iteration of the optimization.

In the first step 41, the expected signal is therefore determined. The characteristics of the array 31, 32, 33 being known by construction, for the plurality of P directions to be scanned in reception by BFC, the P expected-signal vectors indexed S(k) are determined by calculation or by electromechanical simulation prior to the implementation of the hardware.

Each of these vectors is a column vector with M elements corresponding to the M elements of the array. To perform the calculation, a source positioned successively in the P directions, virtually situated at infinity and producing the same power flux in line with the array whatever the direction of this source, is simulated. The method used to calculate the vector received by the elements of the array is well known to those skilled in the art.

The "expected" signal can be represented in the following generic form.

Take a reference origin point O (which may be arbitrary, but identical for all the elements).

Let $M_i$ be the position of the phase centre of the element of rank "i".

Let $\vec{u}(k)$ be the directing vector of the $k^{th}$ of the P directions to be scanned.

The signal $s_i$ expected for an element of order i of the array is expressed as the product of an amplitude by a phase-shift term due to the spatial position in the array of the phase centre of this element, this element $s_i$ is given by the following relationship, it concerns a voltage proportional to volts:

$$s_i(\vec{u}(k)) = a_i(\vec{u}(k)) \times \exp\left(2\pi \cdot j \frac{\vec{u}(k) \cdot \overrightarrow{OM_i}}{\lambda}\right) \quad (1)$$

The first term of the second member of the equation (1) characterizes the contribution of the element of order i to the total gain of the array after phase-aligning all the individual contributions. The second term is the phase-shift due to the position of the element of order i in the array.

The vector consisting of the individual expected signals $s_i$ constitutes S(k)=vector of the expected signals for a signal originating from the $k^{th}$ direction of BFC. This expected signal vector is given to within a multiplying factor which is not significant because it is eliminated thereafter. Only the values relating to the elements of the vector relative to one another are significant.

In the second step 42, the optimum gain set is determined for a given direction of scanning by BFC. In this step, the maximization of the signal-to-noise ratio, and the maximum achievable signal-to-noise are determined.

The linear combination of the individual sources which maximizes the signal-to-noise ratio at the output of the summation is given by the following relationship:

$$Y = W^H X \text{ with: } W = \alpha. R^{-1} S \quad (2)$$

The term Y is a scalar consistent with volts. It can be expressed Y=Ys+b, where Ys is the "useful" signal and b is the residual noise (clutter+noise). The signal-to-noise ratio $SNR_{OUTPUT}$ at the output used thereafter is given by the following relationship:

$$SNR_{OUTPUT} = \frac{\|Y_s\|^2}{E\{\|b\|^2\}} \quad (3)$$

It can thus be seen, trivially, that the non-zero constant $\alpha$ of the relationship (2) is arbitrary and is eliminated from the expression of the signal-to-noise ratio SNR. On the other hand, by being a function of S (that is to say, of the observation direction), it can be used for normalization purposes: it is possible, for example:
  to proceed so that, with a given incident flux, the received signal amplitude is independent of the direction of arrival in the scanning space when the direction of arrival coincides exactly with one of the P scanning directions, that is to say, when: X=S(k), $\forall$ k$\in$[1,P]
  or to proceed so that the noise at the output is independent of the BFC direction, therefore of S.

The function of the set of gain coefficients $w_i(\vec{u}(k))$ to be determined is notably to assign more "weight" to the elements picking up a high signal power because of their positions in the array and to conversely set a low weight for the elements picking up a low signal power.

This optimal formation is in reality a space-adapted filter.

Figure 5:
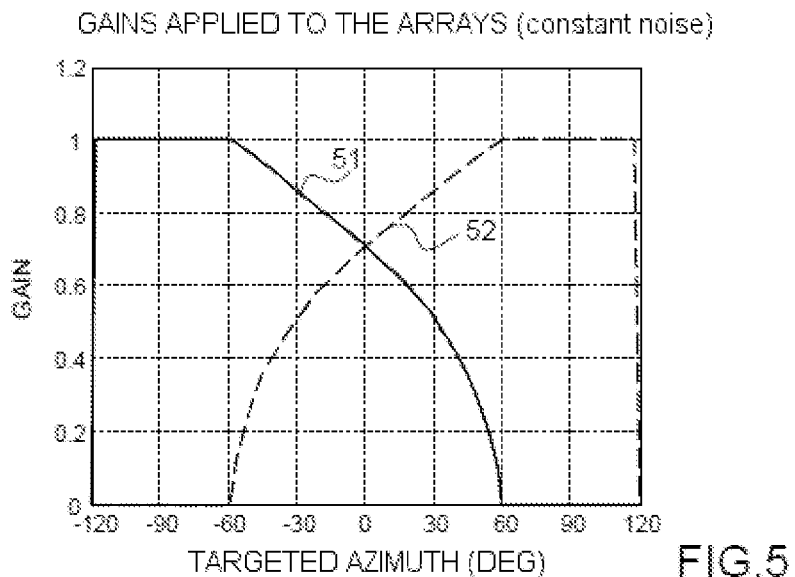
FIG. 5, an illustration of the gains applied to the subarray elements as a function of the BFC direction.

FIG. 5 shows, in the case of an array in the form of a dihedron, how the gains associated with the two arrays, left and right for example, vary as a function of the direction of BFC, given constant noise. A high weight is applied to the elements likely to contribute a lot to the total received signal, whereas a low weight, or even zero weight, is applied to the elements likely to contribute only a little to the total signal, but likely to contribute to the total noise. A first curve 51 represents the gain applied to a first array, for example the right array, and a second curve 52 represents the gain applied to the second array, for example the left array, as a function of the azimuth angle.

In the general case, the signal-to-noise ratio SNR at the output of the channel former is given by the following relationship:

$$SNR_{FFC}(x, s) = \frac{|(R^{-1}S)^H X|^2}{|S^H R^{-1} S|} \quad (4)$$

This relationship is used notably, by varying the direction of arrival of the signal, and therefore by varying X, to calculate the equivalent antenna pattern. If X=S, case of the adapted filter, the maximum SNR is then given by the relationship:

$$SNR_{max}(S) = |S^H R^{-1} S| \quad (5)$$

The first waveform processes only the targets on thermal noise. By assuming that there is no interference, the matrix R is calculated a priori and has the value: $R=\sigma^2 I$, in which $\sigma^2$ is the power of the thermal noise on a reception channel, identical for all the sources, and I is the identity matrix of dimension M.

In these conditions:

$$R^{-1} = \frac{1}{\sigma^2} I \quad (6)$$

If $p_i(k)$ is the individual power received by the $i^{th}$ element originating from a transmission source in the $k^{th}$ direction to be scanned such that it corresponds to the expected signal S(k), then the relationship (5) amounts to calculating the following quotient, in which it can be seen that all the individual powers have indeed been added up in power:

$$SNR_{max}(S(k)) = \frac{\sum_{i=1}^{M} p_i(k)}{\sigma^2} \quad (7)$$

In other words, the sum $$\sum_{i=1}^{M} p_i(k)$$

represents the maximum power intercepted by the antenna when the energy source originates from the $k^{th}$ direction.

Figure 6:
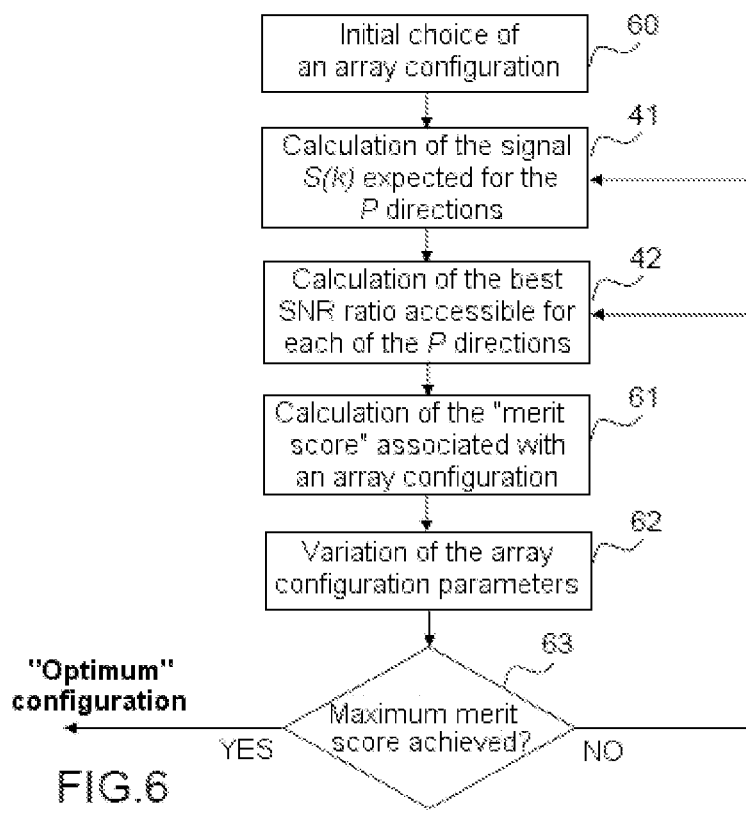
FIG. 6, a more detailed illustration of the steps for obtaining the antenna array.

FIG. 6 illustrates the third step 43 in which the optimization iteration is performed notably on the steps 41 and 42 described previously.

In a preliminary phase 60, a basic configuration of the array 31, 32, 33 is chosen. This configuration notably defines the form of the array in the azimuth plane relative to the radar, polyhedron or curve for example. The basic configuration also notably comprises a number of radiant elements for each segment of the array, with an original spacing between these elements. The final configuration, which is determined on completion of the different steps, retains the initial appearance, polyhedron or curve for example, the other parameters possibly being modified.

As indicated previously, in the first step 41, the expected signal vector is calculated. A source at a very great distance from the array is successively positioned in the P directions in such a way that the power flux in line with the array is constant and does not depend on the direction.

In the second step 42, the optimum summation of the signals received by each element is performed for each of the preceding P directions so as to maximize the signal-to-noise ratio SNR.

In a next step 61, the figure of merit chosen for the optimization is calculated.

In a next step 62, the parameters of the array are varied. It is thus possible to vary the fold angle φ of the dihedron 31, the number and the orientations of the segments of a polyhedron 31, 32, and the distribution of the radiant elements by segments. This list of parameters to be varied is not exhaustive. The parameters to be varied and the variation pitch are determined notably according to mechanical and cost constraints. This variation of the parameters may be empirical and may require the expertise of a man skilled in the art.

In a next step 63, the configuration is determined, out of the configurations tested, which maximizes the figure of merit. There is a loop back to the steps 41, 42, depending on the nature and the placement of the parameters of the array which have been modified, until the maximum figure of merit is achieved. The configuration of the array is determined by the final choice of its parameters.

Figure 7:
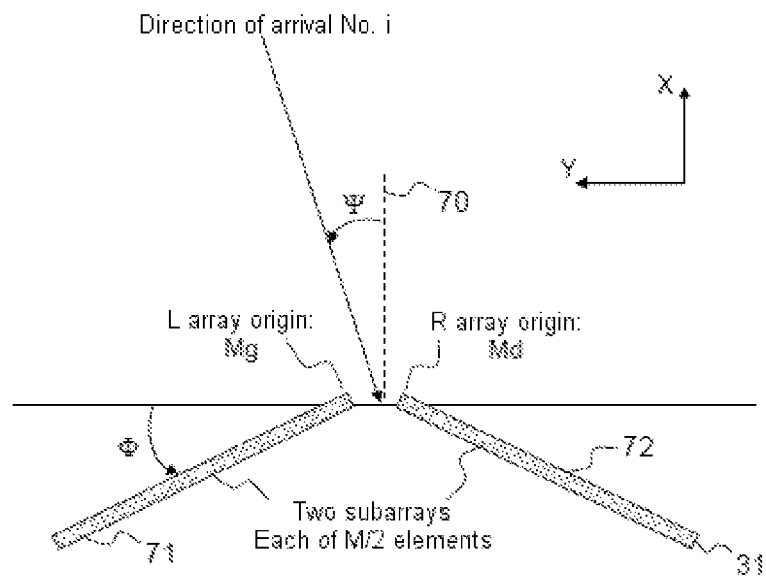
FIG. 7, an exemplary antenna array in the form of a dihedron in the azimuth plane of the radar.

FIG. 7 illustrates an example of optimization with an array 31 in the form of a dihedron. This array 31 is formed by two half arrays 71, 72 each having M/2 radiant elements and spaced apart from one another by a distance λ/2, λ being the length of the wave received. The distance is taken between the origin Mg of a subarray 71, for example left, and the origin Md of the other subarray 72, right.

In a first step, the expected signal is determined.

By taking the point O, the middle of the segment [Mg, Md], as reference, all the elements of a half-array being, by assumption, identical, the "expected-signal" vectors of the two half-arrays 71, 72 can be estimated by developing the relationship (1). This method is, however, fairly simplistic, as has previously been indicated, this determination could be done more finely by electromagnetic simulation. This here is a simple illustration of the optimization method.

The signals expected for the left subarray and the right subarray are respectively given by the following relationships (8) and (9):

$$S_G(\psi) = a_G(\vec{u}) \times \sum_{i=1}^{M/2} \exp\left(2\pi \cdot j \frac{\vec{u} \cdot \overrightarrow{OM}_{G_i}}{\lambda}\right) \text{ with } \vec{u} = \begin{pmatrix} \cos(\psi) \\ \sin(\psi) \end{pmatrix}$$

$$S_D(\psi) = a_D(\vec{u}) \times \sum_{i=1}^{M/2} \exp\left(2\pi \cdot j \frac{\vec{u} \cdot \overrightarrow{OM}_{Di}}{\lambda}\right)$$

ψ characterizing a direction of arrival at the point O, for example of order i. ψ is the angle between this direction and the axis of symmetry 70 of the dihedron 31. In this formula, it concerns voltages and not powers.

In these relationships (8), (9), M is an even integer number since the total array of M elements is divided into two identical subarrays. The functions "$a_G$" and "$a_D$" characterize three aspects:

1. The "master cross-section" of the array visible in a direction, that is to say, its apparent surface region. The variation of this "master cross-section" is reflected by a variation of received power by cos(ψ−φ) for the left array and by cos(ψ+φ) for the right array, φ being the fold angle.
2. The angular operating range of an array. This range is modelled by the following function, $\theta_{MAX}$ being the maximum misalignment angle relative to the normal to the array:

1 If $|\psi-\phi| < \theta_{MAX}$

0 Otherwise (10)

3. The directivity of the individual sources. It is common practice to approximate this variation of received power by the term $\cos(\psi-\phi)^\eta$ for the left array and by $\cos(\psi+\phi)^\eta$ for the right array, with $\eta \approx 0.5$. In other words, this directivity varies as a function of $\cos^\eta$ of the angle relative to the normal to the subarray.

The functions "$a_G$" and "$a_D$" of the relationships (8) and (9) are ultimately:

$$a_G(\psi,\phi) = \sqrt{\cos^{J/\eta}|\psi-\phi|} \text{ if } [|\psi-\phi|<\theta_{MAX}], \text{ otherwise } 0$$

$$a_D(\psi,\phi) = \sqrt{\cos^{J/\eta}|\psi-\phi|} \text{ if } [|\psi-\phi|<\theta_{MAX}], \text{ otherwise } 0$$

In a second step, the optimum form of the dihedron is determined.

Figure 8:
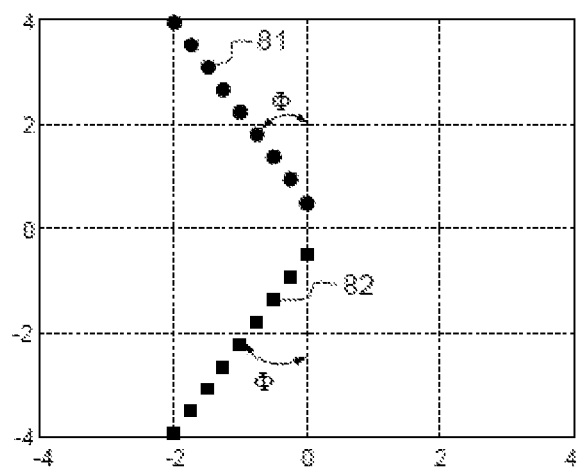
FIG. 8, a plan view of an array in the form of a dihedron to be optimized.
Figures 9A, 9B:
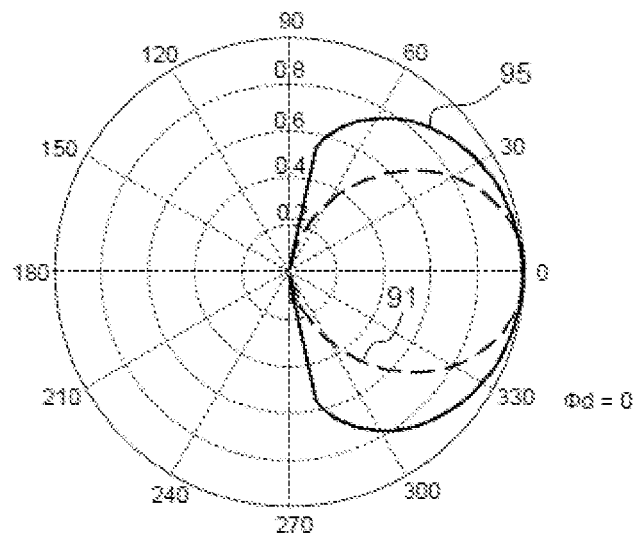
FIGS. 9a to 9d, an illustration of the maximum gains and standardized ranges respectively for the following four fold angles of the preceding dihedron: 0°, 15°, 30° and 45°.
Figure 9C:
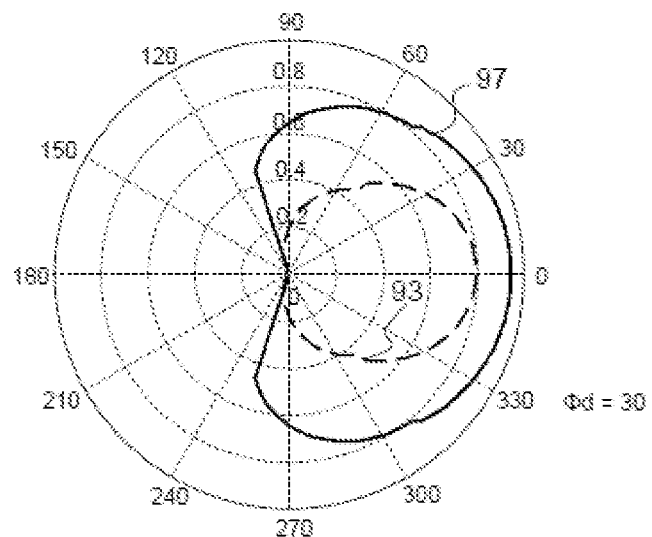
Figure 9D:
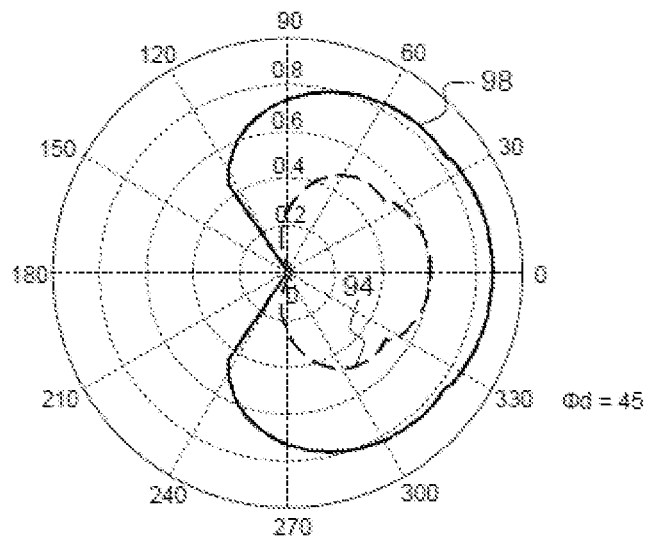

FIG. 8 illustrates the two subarrays 71, 72 of the dihedron to be optimized, by the representation of their radiant elements 81, 82, the array 71, 72 being represented in its basic configuration. In this example, the assembly comprises 18 radiant elements, or M=18, each subarray comprising M/2=9 radiant elements. The optimum fold angle φ of the dihedron is sought.

The figure of merit used below is:

$$Q = \left( \prod_{k=1}^{P} \beta_k \cdot \text{Gain}(\psi_k) \right)^{\frac{1}{P}},$$

in which Gain($\psi_k$) is the maximum gain in the $k^{th}$ direction and $\beta_k$ a weighting term which has the value 2 if $|\psi_k|<45°$, which has the value 1 between 45° and 110° and which has the value 0 otherwise. In other words, this criterion is:

eliminatory if the coverage does not go up to +/−110°;

prioritizes the gain in a segment of +/−45° around the axis. This is, however, only one example of a criterion. Other criteria can equally be envisaged.

For 4 fold angles φ=0°, 15°, 30° and 45°, maximum gains are obtained respectively illustrated by the FIGS. 9a, 9b, 9c and 9d. The maximum gains are represented by the patterns 91, 92, 93, 94 in "Gain/Azimuth" polar representation.

The value 1 corresponds to that of the gain of the array with zero fold angle and in the axis. The fourth root of this normalized gain, which corresponds to the accessible relative range is also shown by patterns 95, 96, 97, 98, and for a transmitting antenna covering the +/−110° field with constant gain According to the preceding criterion, the zero fold angle is eliminatory and the best configuration is situated towards a fold angle around 30°. This result would have been obtained using the iterative process described in FIGS. 4 and 6, by iterating the calculation of the patterns of FIGS. 9a, 9b, 9c and 9d on the fold angle.

Figure 10:
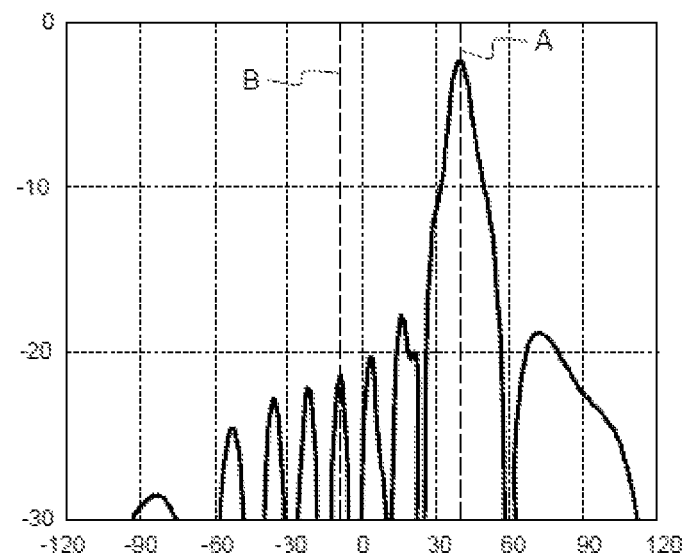
FIG. 10, an exemplary radiation pattern.

FIG. 10 illustrates a normalized antenna gain as a function of the azimuth angle, for a planar array. The preceding optimization maximizes the gain without any constraint on the quality of the radiation pattern in terms of secondary lobes. By way of example, for a fold angle of 30°, a spacing of λ between the ends Mg and Md, and a pitch between radiant elements 81, 82 for each subarray 71, 72, the pattern illustrated by FIG. 10 is obtained for an optimized BFC with maximum gain and for a viewing angle of 40°, direction A.

An echo corresponding to a target of normal SER (Surface Equivalent Radar) with respect to the application concerned and situated at a medium or great distance can be detected only if the main lobe of the beam formed in reception is directed towards this target, case of a target in the direction A in the example of FIG. 10, that is to say, if the signal-to-noise S/N ratio exceeds the detection threshold. On the other hand, the S/N ratio is insufficient if this same target is situated in a direction B of FIG. 10 towards −8°, the beam being formed towards the direction A.

Conversely, a target of strong SER, or else situated at a short or very short distance, can be detected in the main lobe, but also if it is situated in the direction of a second lobe, case of a target in the direction B in the example of FIG. 10, because the S/N ratio may then exceed the detection threshold, even if the gain of the secondary lobe is low (in this case approximately 20 dB lower than the main lobe). Without particular processing, the target is wrongly located in the direction of the main lobe.

Figure 11:
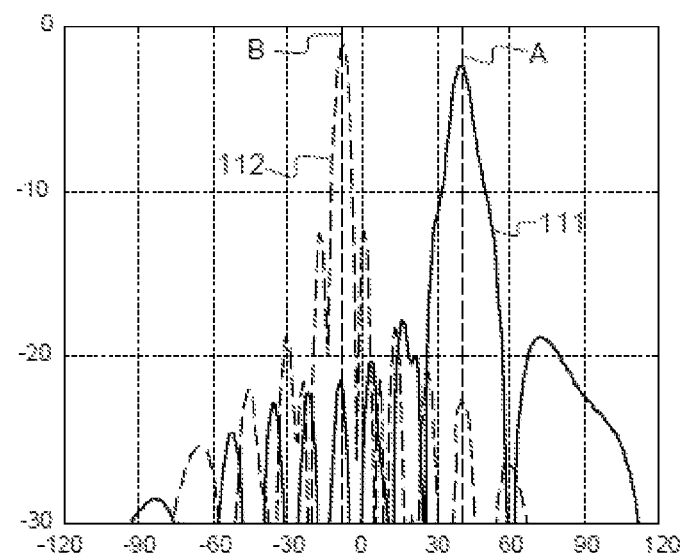
FIG. 11, the BFCs of two beams.

FIG. 11 illustrates an exemplary solution. A processing according to the invention makes the assumption that the probability that two or more detectable echoes of targets, whether useful or not, are simultaneously present in a speed, distance or distance-speed resolution cell is negligible. For a given quantity of observable targets, the processing works all the better when the waveform has high resolution:

either in speed (Doppler);

or in distance;

or in both distance and speed dimensions.

The BFC of P beams is performed for each speed and/or distance cell of the space covered by the waveform used. This beam forming is done in all ways and independently of the implementation of the invention.

For a Speed and/or Distance cell, it is therefore potentially possible to have p detections: 0≤p≤P.

If p≥2, only the beam forming which has resulted, in the given resolution cell, in the absolute maximum signal power, is retained: this means in fact that the direction of formation of this beam is the one closest to the actual direction of the target. This is illustrated by FIG. 11 which shows the BFCs for two beams, one 111 towards 40° in the preceding direction A, the other, 112, towards −8° in the preceding direction B.

In the case of a weak incident signal, this can be detected only when the main lobe of a BFC is directed towards it, otherwise the S/N ratio would be too low to allow for a detection by the secondary lobes. Given this assumption, a target towards 40° will be detected only on the BFC formed towards 40° represented by a first curve 111 and a target towards −8° will be detected only on the BFC formed towards −8° represented by a second curve 112. There is therefore no ambiguity concerning the angular location of a weak target provided that the level difference between the main lobe and the secondary lobes significantly exceed the S/N ratio corresponding to the detection threshold (usually from 5 to 10 dB for the "usual" false alarm probabilities and routine detection processing operations). In the example of FIG. 11, this level difference is of the order of 20 dB, therefore satisfies the preceding criterion.

In the other case, where the incident signal is powerful, it is detected when a BFC is directed by its main lobe to it, but also when another BFC directs a secondary lobe towards this echo. For example, if an echo is situated at −8°, direction B, and exceeds by 20 dB the detection S/N on the BFC towards −8°, it will be detected after this BFC, but also by all the other BFCs were the relative level of secondary lobes exceeds 20 dB (as an absolute value). On the other hand, the right direction A is given by the BFC where the signal maximum is observed. The other weaker detections observed on the other BFCs are rejected: this is why the processing does not wrongly eliminate useful detections, provided that the probability of having two or more targets per Distance-Speed resolution cell is negligible. This is notably the case of the 1st waveform employed in the thermal noise Doppler region.

The fact that all the signals from P beams formed by calculation all use the same vector of signal samples renders the method independent of the level fluctuations of the targets since all the BFCs use the same set of signals at the same instant.

Once the correct BFC is identified, it is possible to implement the equivalent of a single-pulse angle error measurement processing by using the lobes formed by the adjacent BFCs. It is possible, for example, to use the lobe where the signal is at its maximum and one of the two adjacent lobes where the signal is closest to the maximum. In this way, it is very simply possible to locally form by calculation a sum channel Σ and a difference channel Δ, then use an angle error measurement principle known to those skilled in the art.

The solution described previously offers the benefit of adding only a marginal quantity of processing compared to a solution inevitably necessitated by the BFC of P beams in P directions. Furthermore, it does not affect the detection sensitivity since it is applied to the signals obtained from the beams formed and not to the signals obtained from the individual sources, even subarrays, in which the S/N ratio is necessarily lower and in which the "True target in the right direction or phantom seen by a secondary lobe" decision-taking, with a very low probability of wrong decision, becomes difficult.

The proposed solution can be applied in the thermal noise Doppler region in which the quantity of echoes, useful or not, whose levels render them detectable, is limited in number. It is difficult to apply to the region of clutter if there are a large number of clutter echoes of sufficient level.

For these reasons, the proposed processing is advantageously intended to be used with the first waveform for fast targets "on thermal noise", precisely where a great range, and therefore a great sensitivity, is sought.

The invention claimed is:

1. A radar system comprising:
   at least one processing means,
   one transmitting antenna, and
   one receiving antenna formed by an array of radiant elements, a configuration of the array being characterized by a set of parameters determining a geometrical form of the array, a number of radiant elements and a pitch between the radiant elements, a radiation pattern of said transmitting antenna being determined to maximize an antenna gain, the configuration of the array being defined according to the following steps: in a preliminary step, a basic configuration of said array is chosen; in a first step, a signal expected from a target in P directions is determined; in a second step, a summation, for each of said P directions, of signals received by each radiant element is determined so as to maximize a signal-to-noise ratio at an output of said summation; in a third step, a figure of merit is calculated as a function of signal-to-noise ratios received on said P directions; in a fourth step, the set of parameters of the array are varied and then there is a loop back to the first or the second step depending on the parameters of the array that have been modified, the configuration being chosen from the configurations which maximizes a figure of merit.

2. A radar system according to claim 1, wherein the basic configuration of the array is a polyhedron in the azimuth plane relative to the radar.

3. A radar system according to claim 2, wherein the basic configuration of the array is a dihedron in the azimuth plane relative to the radar.

4. A radar system according to claim 1, wherein the basic configuration of the array is a continuous curve in the azimuth plane relative to the radar.

5. A radar system according to claim 1, wherein the figure of merit is a function of an angular regularity criterion of the receiving antenna gain or signal-to-noise ratio received over a given angular range.

6. A radar system according to claim 5, wherein the figure of merit is also a function of eliminatory conditions not providing a minimum coverage of certain directions in the radar detection space.

7. A radar system according to claim 1, wherein, the antenna beams being calculated in P directions by a BFC function: the possible detections of a target by the secondary lobes of one or more beams formed by BFC are processed by the at least one processing means using an algorithm based on the comparison of the power levels of the echoes picked up by said beams received in a distance-speed resolution cell of the radar, a single detection at most not being possible for each distance-speed resolution cell; the at least one processing means use the assumption that there may probably be no more than one echo with a signal-to-noise ratio that is sufficient for it to be detectable, for a given resolution cell of the radar, either in speed mode or in distance mode, or, alternatively, a distance-speed depending on the at least one processing implemented; if there is more than one echo detectable for each resolution cell out of the plurality of beams formed by BFC, only the echo and the BFC that obtain the maximum power or the maximum signal-to-noise ratio are/is considered valid.

8. A radar system according to claim 7, wherein the angular direction of the target is obtained by a single-pulse-type technique, the precise direction being a function of the signal received in the BFC lobe where the signal maximum has been observed and on at least one of the adjacent lobes.

9. A radar system according to claim 7, wherein the precise angular direction of the target is obtained by a single-pulse-type technique by using two BFC lobes, the lobe where the received signal is at its maximum and the lobe in immediate proximity where the signal has a power just below the maximum.

10. A radar system according to claim 1, being equipped to an aircraft to ensure an obstacle avoidance function.

11. A radar system according to claim 10, wherein the aircraft is auto-piloted.

* * * * *